United States Patent
Hannukainen et al.

(10) Patent No.: US 9,945,682 B2
(45) Date of Patent: Apr. 17, 2018

(54) METHOD AND APPARATUS FOR DETERMINING A CALCULATED ROUTE BASED ON LOCATION SAMPLE (S) ASSOCIATED WITH TRAVEL ROUTE(S)

(75) Inventors: Jaakko Hannukainen, Tampere (FI); Antti Johannes Eronen, Tampere (FI); Jussi Leppanen, Tampere (FI); Amir Abdi, Tampere (FI); Henri Puranen, Tampere (FI)

(73) Assignee: Provenance Asset Group LLC, Essex, CT (US)

( * ) Notice: Subject to any disclaimer, the term of this patent is extended or adjusted under 35 U.S.C. 154(b) by 833 days.

(21) Appl. No.: 13/449,824

(22) Filed: Apr. 18, 2012

(65) Prior Publication Data
US 2013/0282269 A1 Oct. 24, 2013

(51) Int. Cl.
*G01C 21/00* (2006.01)
*G01C 21/34* (2006.01)

(52) U.S. Cl.
CPC .................. *G01C 21/3484* (2013.01)

(58) Field of Classification Search
CPC ................................. G01C 21/3484
See application file for complete search history.

(56) References Cited

U.S. PATENT DOCUMENTS

| 7,392,247 B2 | 6/2008 | Chen et al. |
| 2008/0201074 A1* | 8/2008 | Bleckman et al. ........... 701/211 |
| 2009/0319230 A1* | 12/2009 | Case et al. .................... 702/182 |

FOREIGN PATENT DOCUMENTS

| JP | 2008-077421 A | 4/2008 |
| WO | WO 2009/151807 A1 | 12/2009 |

OTHER PUBLICATIONS

Carvalho et al., "A General Data Fusion Architecture": <http://citeseerx.ist.psu.edu/viewdoc/download?doi=10.1.1.118.9002&rep=rep1&type=pdf>.
Chen et al., "An Architecture for Multi-Sensor Fusion in Mobile nvironments" : <http://citeseerx.ist.psu.edu/viewdoc/download-?doi=10.1.1.113.3502&rep=rep1&type=pdf>.
Padovitz et al., "An Approach to Data Fusion for Context Awareness": <http://www.springerlink.com/content/cenbta2k4ww4fygh/>.

* cited by examiner

*Primary Examiner* — Brian P Sweeney
(74) *Attorney, Agent, or Firm* — Dinsmore & Shohl LLP

(57) ABSTRACT

An approach is provided for providing a calculated route using waypoints associated with a traveled route. A traveled route platform processes and/or facilitates a processing of one or more location logs to determine one or more waypoints, wherein the one or more location logs include, at least in part, one or more location samples for at least one device on a traveled route. The traveled route platform then processes and/or facilitates a processing of the one or more waypoints via one or more routing engines to determine a calculated route as a representation of the traveled route.

20 Claims, 11 Drawing Sheets

200

US 9,945,682 B2

1

METHOD AND APPARATUS FOR DETERMINING A CALCULATED ROUTE BASED ON LOCATION SAMPLE (S) ASSOCIATED WITH TRAVEL ROUTE(S)

BACKGROUND

Service providers (e.g., wireless, cellular, etc.) and device manufacturers are continually challenged to deliver value and convenience to consumers by, for example, providing compelling network services. One area of development includes services and technologies for calculating routes. For example, Global Positioning System (GPS) data along with other location detection techniques may be utilized to determine a route traveled by a user. A user device (e.g., cellular device) may, for instance, detect a GPS signal and determine the path traveled by its user. However, in many cases, GPS signal may be unavailable or inaccurate, especially in urban areas with tall buildings. Users of traditional systems may, for instance, experience distortions or inaccuracies in the calculated routes representing their traveled paths due to multipath effects (e.g., radio signals reflecting off buildings), artificial sources of interference (e.g., electromagnetic interference), and the like. Accordingly, service providers and device manufacturers face significant challenges in providing accurate route calculation to its users.

SOME EXAMPLE EMBODIMENTS

Therefore, there is a need for an approach for providing a calculated route using waypoints associated with a traveled route.

According to one embodiment, a method comprises processing and/or facilitating a processing of one or more location logs to determine one or more waypoints, wherein the one or more location logs include, at least in part, one or more location samples for at least one device on a traveled route. The method also comprises processing and/or facilitating a processing of the one or more waypoints via one or more routing engines to determine a calculated route as a representation of the traveled route.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more location logs to determine one or more waypoints, wherein the one or more location logs include, at least in part, one or more location samples for at least one device on a traveled route. The apparatus is also caused to process and/or facilitate a processing of the one or more waypoints via one or more routing engines to determine a calculated route as a representation of the traveled route.

According to another embodiment, a computer-readable storage medium carries one or more sequences of one or more instructions which, when executed by one or more processors, cause, at least in part, an apparatus to process and/or facilitate a processing of one or more location logs to determine one or more waypoints, wherein the one or more location logs include, at least in part, one or more location samples for at least one device on a traveled route. The apparatus is also caused to process and/or facilitate a processing of the one or more waypoints via one or more routing engines to determine a calculated route as a representation of the traveled route.

2

According to another embodiment, an apparatus comprises means for processing and/or facilitating a processing of one or more location logs to determine one or more waypoints, wherein the one or more location logs include, at least in part, one or more location samples for at least one device on a traveled route. The apparatus also comprises means for processing and/or facilitating a processing of the one or more waypoints via one or more routing engines to determine a calculated route as a representation of the traveled route.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a calculated route using waypoints associated with a traveled route are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
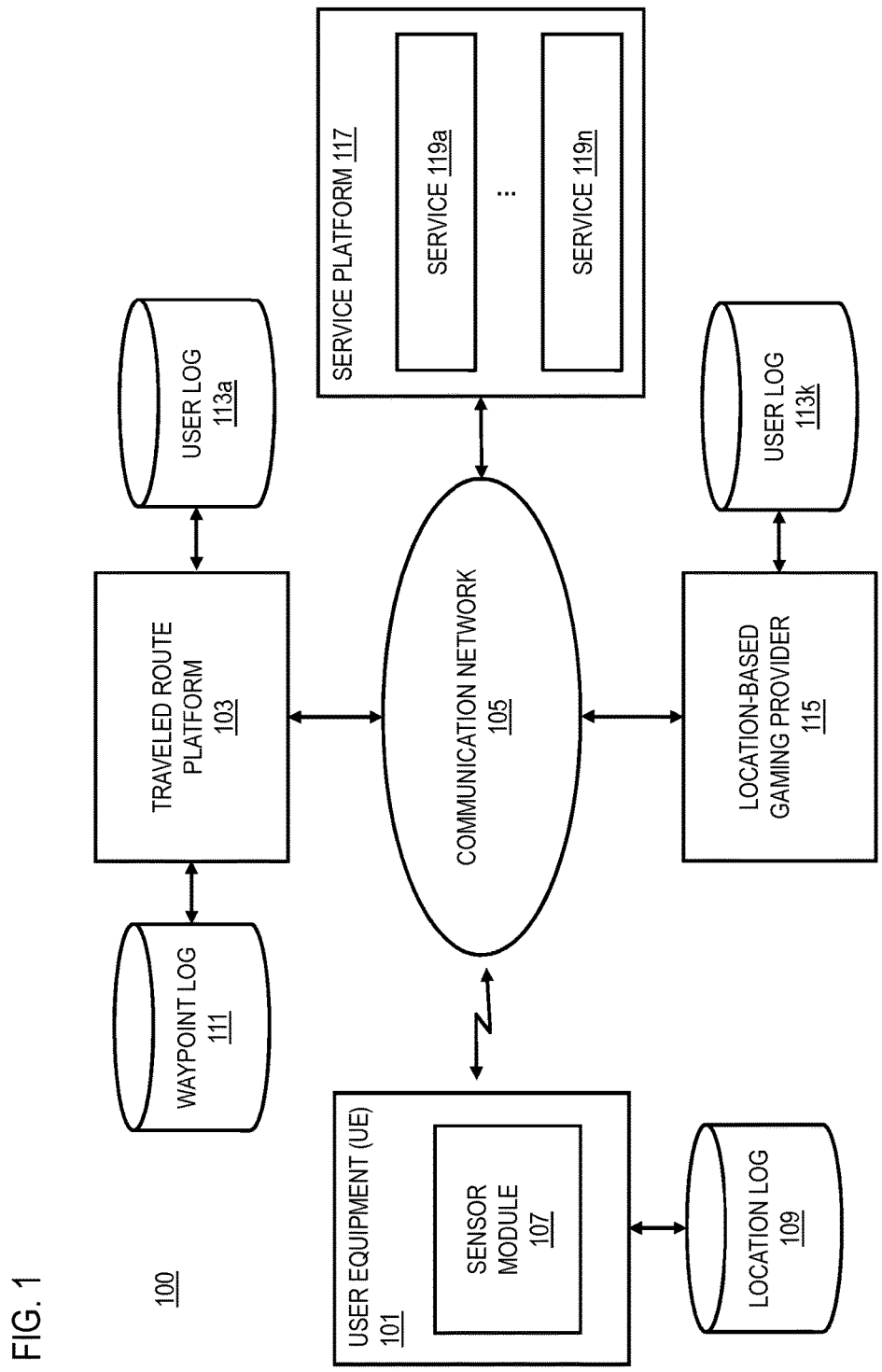
FIG. 1 is a diagram of a system capable of providing a calculated route using waypoints associated with a traveled route, according to one embodiment.

FIG. 1 is a diagram of a system capable of providing a calculated route using waypoints associated with a traveled route, according to one embodiment. As discussed, route calculation may be performed for a route traveled by a user using GPS data obtained by the user's device (e.g., mobile device). However, GPS data along with data collected using other location detection techniques frequently contain errors as a result of multipath effects (e.g., radio signals reflecting off buildings), artificial sources of interference (e.g., electromagnetic interference), and the like. Errors may, for instance, be prevalent in urban areas that contain hard surfaces (e.g., sidewalks, roads, buildings, etc.), sources of interference, and the like. Although service providers may attempt to provide accurate route calculate by simply filtering out detected errors, many errors associated with the location detection data are not detected and, thus, obscure calculations for the traveled route.

To address this problem, a system 100 of FIG. 1 introduces the capability to provide a calculated route using waypoints associated with a traveled route. By way of example, the system 100 may determine one or more waypoints based on location samples of a traveled route (e.g., traveled by a user with a user device) in a location log. Those waypoints may then be processed via a routing engine to determine a calculated route as a representation of the traveled route. As such, by using waypoints associated with the location samples (e.g., GPS location data) to compute the calculated route (as opposed to deriving the calculated route directly from the location samples), the errors associated with the location samples may be mitigated. Specifically, the calculated route may utilize routes provided by routing engines, such as sidewalks, streets, paths, etc., rather than certain location point trajectories actually received from the GPS sensor, such as through buildings, rivers, and the like. It is noted that, in some embodiments, the calculated route (or routes) may be utilized in a game, for instance, to designate an area as conquered based on the calculated route.

As shown in FIG. 1, the system 100 comprises user equipment (UE) 101 having connectivity to traveled route platform 103 via a communication network 105. In one embodiment, UE 101 may detect a physical location of the UE 101 using a sensor module 107. Additionally, or alternatively, the UE 101 and/or the traveled route platform 103 may access one or more location logs 109. In this manner, the traveled route platform 103 may process (e.g., filter, error correct, etc.) one or more location samples from one or more location logs to determine one or more waypoints to store in waypoint log 111. The traveled route platform 103 may then process one or more waypoints (e.g., using one or more routing engines) to determine a calculated route representing a route traveled by the UE 101 and associate the calculated route with one or more users in a user log 113. It is contemplated that a user log 113 may be located at the traveled route platform 103 (e.g., user log 113a), for example, for a game associated with the traveled route platform 103, located at a location-based gaming provider 115 (e.g., user log 113k), etc.

In one embodiment, the system 100 comprises a service platform 117, the services 119a-119n (also collectively referred to as services 119) of the service platform 117, and location-based gaming provider 115. By way of example, the service platform 117, the services 119, and the location-based gaming provider 115 may include or otherwise support services (e.g., routing engines, user information, social networking information, gaming information, etc.) that provide one or more location samples, routing information, or a combination thereof.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network (e.g., Bluetooth®, wireless fidelity (WiFi), worldwide interoperability for microwave access (WiMAX), near-field communication (NFC), etc.), or any other suitable packet-switched network, such as a commercially-owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., WiMAX, Long Term Evolution (LTE) networks, code division multiple access (CDMA), wideband code division multiple access (WCDMA), WiFi, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the traveled route platform 103, the location-based gaming provider 115, and the service platform 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

In another embodiment, the traveled route platform 103 may determine an area bounded by the calculated route. Moreover, the traveled route platform 103 may designate the area as a conquered area associated with (a) the at least one device, (b) at least one user associated with the at least one device, or (c) a combination thereof. By way of example, the traveled route platform 103 may determine that the calculated route forms a closed loop around an area, and designate the area as bounded by the calculated route. The traveled route platform 103 may then, based on the determination that the area is bounded by the calculated route, designate the area as a conquered area associated with, for example, the UE 101, a user (or subscriber) associated with UE 101, a group or team associated with UE 101, and the like.

In another embodiment, the traveled route platform 103 may process the one or more location logs to determine at least one mode of transportation. Moreover, the traveled route platform 103 may associate the at least one mode of transportation with the one or more waypoints, the calculated route, the conquered area, or a combination thereof. For example, the traveled route platform 103 may access one or more location logs (e.g., location log 109), determine an average a rate of travel of one or more location samples in the location log, and select a mode of transportation that corresponds to the average rate of travel. In another example, the traveled route platform 103 determines a mode of transportation by determining a predicted location sample for each of one or more location samples stored in a location log (e.g., location log 109) for each of a plurality of modes of transportation. A level of certainty may then be determined for each of the plurality of modes of transportation based on a difference between the predicted location samples and the one or more location samples stored in the location log. Thereafter, the traveled route platform 103 may select a mode of transportation that corresponds to the highest level of certainty. As such, the traveled route platform 103 determines at least one mode of transportation using certainty values that corresponds to the difference between predicted values and the one or more location samples stored in the one or more location logs. Once the traveled route platform 103 determines at least one mode of transportation, the traveled route platform 103 associates the at least one mode of transportation, for example, by associating information indicating the at least one mode of transportation with one or more waypoints, a calculated route, a conquered area, or a combination thereof.

In another embodiment, the traveled route platform 103 may perform a determination of at least one mode of transportation at least partly based on likelihoods or probabilities for different modes of transportation received from the UE 101. In one embodiment, the UE 101 performs a classification between different modes of transportation (walking, running, driving a car, etc.) based on accelerometer data received from the sensor module 107. The classification between motion modes can be performed with any known feature extraction and pattern recognition methods applied on the accelerometer signal from the sensor module 107. In particular, in one embodiment the UE 101 performs classification of transportation mode by extracting mel-frequency cepstral coefficient features from the magnitude of the accelerometer signal. The UE 101 may evaluate a likelihood of at least one Gaussian mixture model having generated the mel-frequency cepstral coefficients and use this likelihood for the transportation likelihood. In this case, a Gaussian mixture model has been trained for different transportation modes, by collecting a number of accelerometer signal samples from different transportation modes, performing mel-frequency cepstral coefficient feature extraction for each accelerometer sample, and training a Gaussian mixture model to model the distribution of mel-frequency feature vectors extracted from the samples corresponding to each transportation mode. The UE 101 may communicate one or more likelihood values associated with one or more transportation modes to the traveled route platform 103, and the traveled route platform 103 may make the final determination of the transportation mode at least partly based on the likelihood values provided by the UE 101.

In another embodiment, the traveled route platform 103 may determine at least one dominance level associated with the area based, at least in part, on the at least one mode of transportation, wherein the designation of the area as the conquered area is based, at least in part, on the at least one dominance level. In a further embodiment, the traveled route platform 103 may determine respective one or more weighting values for the at least one mode of transportation based, at least in part, on an activity level associated with the at least one mode of transportation, wherein the at least one dominance level is further based, at least in part, on the one or more weighting values. By way of example, a user associated with a route calculation indicating a bounded area may have a dominance level associated with the bounded area incremented by, for example, 10 points for a route calculation associated with walking or running, 5 points for a route calculation associated with bicycling, and 1 point for a route calculation associated with a car or a bus. In this case, the traveled route platform 103 may determine a user, or group of users, with the highest number of points for the bounded area, and designate the bounded area as a conquered area.

In another embodiment, the traveled route platform 103 may process the one or more location samples in the one or more location logs via one or more models, one or more filters, or a combination thereof to determine the at least one mode of transportation. In one scenario, the traveled route platform 103 may, for instance, utilize using a Kalman filter with Wiener velocity and random walk models to determine the mode of transportation.

In another embodiment, the traveled route platform 103 may determine the one or more routing engines based, at least in part, on the at least one mode of transportation. In one use case, the traveled route platform 103 may select one or more routing engines that are associated with a determined mode of transportation. As an example, a mode of transportation associated with a car may use a routing engine associated with driving, such that sidewalks and bike paths may be excluded as candidates for routes traveled.

In another embodiment, the traveled route platform 103 may process one or more results of the one or more routing engines to cause, at least in part, a post-processing, an aggregation, or a combination thereof of the one or more results to determine the calculated route. For example, the traveled route platform 103 may filter out route results or location samples that fail to form a closed loop around an area. In another example, the traveled route platform 103 may aggregate results from a plurality of routing engines to determine a calculated route that represents, for example, an average or median of the results from the plurality of routing engines. In yet another example, the traveled route platform 103 may calculate a difference between a calculated route and one or more location samples used to generate the calculated route, and determine to use the calculated route when the calculated difference is within a predefined value.

In another embodiment, the traveled route platform 103 may capture at least one of the one or more location samples. Moreover the traveled route platform 103 may cause, at least in part, another capture of at least another one of the one or more location samples based, at least in part, on a distance threshold, a temporal threshold, or a combination thereof with respect to the capture of the at least one of the one or more location samples. By way of example, the traveled route platform 103 may only store in the location logs (e.g., location log 109) location samples that exceed a time threshold (e.g., 10 seconds) and a distance threshold (e.g., 10 meters) from a previously captured location sample.

In another embodiment, the traveled route platform 103 may process the one or more location logs to cause, at least in part, a filtering of the one or more location samples, wherein the one or more waypoints are determined based, at least in part, on the filtering. In one scenario, the traveled route platform 103 may remove location samples stored in the location logs (e.g., location log 109) indicating a rate of travel that exceeds a rate of travel range associated with a determined mode of transportation. For example, a location sample indicating a rate of travel exceeding 16 kilometers per hour for a UE 101 traveling with a walking mode of transportation may be filtered out of the location logs.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
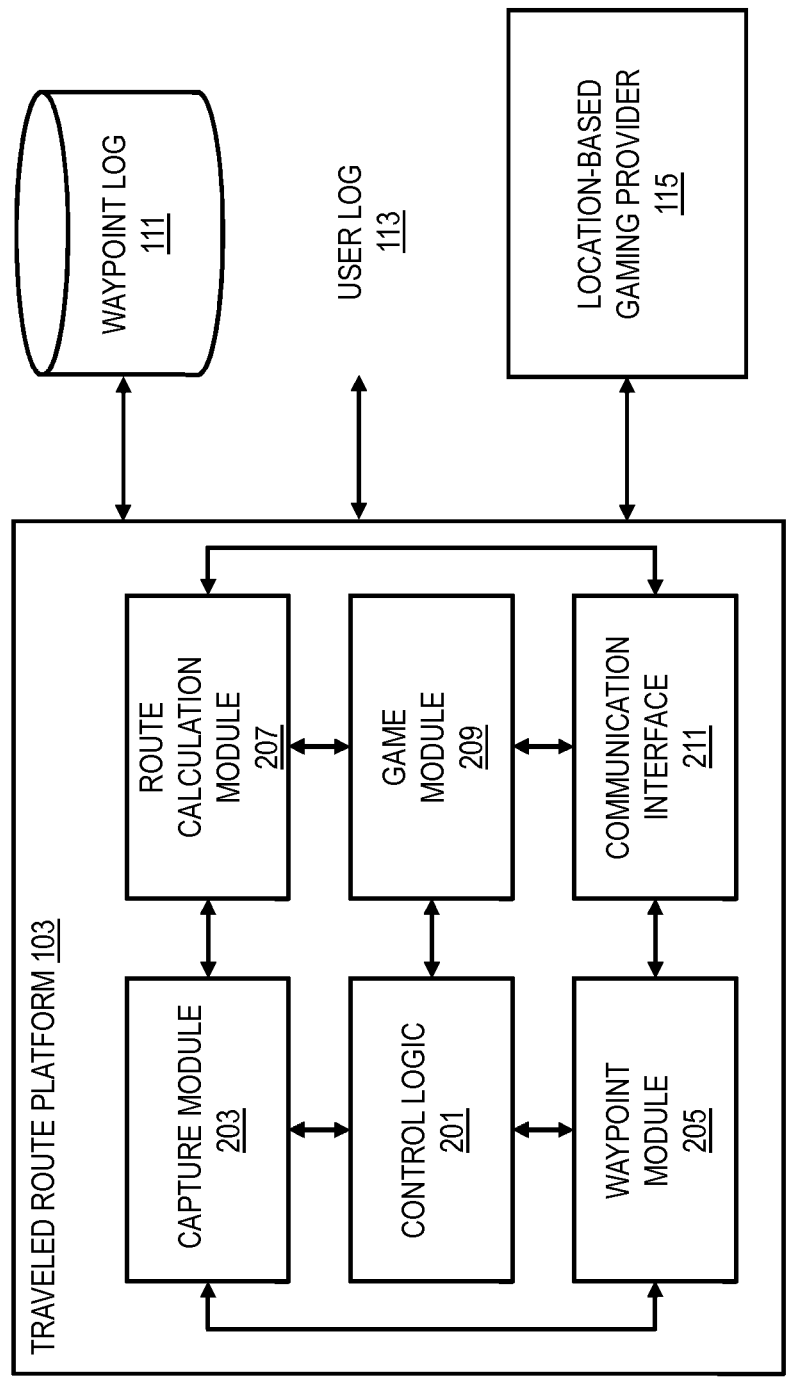
FIG. 2 is a diagram of the components of a traveled route platform, according to one embodiment.

FIG. 2 is a diagram of the components of traveled route platform 103, according to one embodiment. By way of example, the traveled route traveled route platform 103 includes one or more components for providing a calculated route using waypoints associated with a traveled route. It is contemplated that the functions of these components may be combined in one or more components or performed by other components of equivalent functionality. In this embodiment, the traveled route platform 103 includes a control logic 201, an capture module 203, a waypoint module 205, a route calculation module 207, a game module 209, and a communication interface 211.

The control logic 201 oversees tasks, including tasks performed by the capture module 203, the waypoint module 205, the route calculation module 207, the game module 209, and the communication interface 211. For example, although the other modules may perform the actual task, the control logic 201 may determine when and how those tasks are performed or otherwise direct the other modules to perform the task.

The capture module 203 determines whether to store or capture a detected location in the location log 109 or another location log, for example, stored on the traveled route platform 103 or the location-based gaming provider 115. The capture module 203 may work with the communication interface 211 to determine capture setting parameters such as a predetermined distance threshold, a predetermined temporal threshold, and the like from, for instance, the user log 113, the UE 101, the service platform 117, the gaming provider 115, and the like. For example, the capture module 203 may only store in location log 109 location samples exceeding a time threshold (e.g., 10 seconds) and a distance threshold (e.g., 10 meters) from a previously captured location sample. In an exemplary embodiment, the traveled route platform 103 determines capture setting parameters (e.g., time and distance thresholds) and selects location samples to capture in a location log. In another embodiment, the traveled route platform 103 determines the capture setting parameters and sends the parameters to UE 101 (e.g., using the communication interface 211) which selects and stores location samples in the location log 109 based on the capture setting parameters.

The waypoint module 205 determines one or more waypoints representing a traveled route based on the location samples in a location log. The waypoint module 205 may work with a communication interface 211 to determine a mode of transportation associated with the location samples determined by UE 101 by, for example, detecting a motion associated with UE 101 (e.g., accelerometer, location detection, etc.) or by detecting an input by a user indicating a mode of transportation. In one embodiment, the waypoint module 205 determines waypoints by filtering the one or more location samples stored in a location log. For example, waypoint module 205 may remove location samples stored in location log 109 indicating a rate of travel that exceeds a rate of travel range associated with the determined mode of transportation. In one scenario, for instance, a location sample indicating a rate of travel exceeding 16 kilometers per hour (10 miles per hour) for a UE 101 traveling with a walking mode of transportation may not be added as a waypoint. In another example, the waypoint module 205 performs a filtering of the location samples in a location log using a Kalman filter with, for instance, a Wiener velocity model, a random walk model, or a combination thereof. That is, the waypoint module 205 may perform the filtering process by detecting a mode of transportation, and selecting waypoints based on a detected location sample stored in the location log 109. In this manner, waypoints may indicate a different traveled route (and/or different locations) than the one or more location samples stored in a location log because the waypoints may, for example, represent a location between a predicted and sampled location stored in a location log. It is contemplated that a certainty value may be determined for a predicted waypoint, and that waypoints stored in the waypoint log 111 may be closer to predicted values when the certainty value is higher. Additionally, and/or alternatively, a model for predicting motion may be selected based on a mode of transportation. That is, a random walk model may be used to calculate a predicted waypoint for a walking mode of transportation, and a Wiener velocity model may be used to determine a predicted waypoint for a car mode of transportation.

Once waypoints have been determined by the waypoint module 205, the route calculation module 207 may process the waypoints and determine a calculated route representing a route traveled by the UE 101. In one embodiment, the route calculation module 207 determines whether waypoints are within a predefined distance from routes (e.g., roads or paths) associated with one or more routing engines to determine whether or not to process the waypoints via one or more routing engines. For example, the route calculation module 207 may only process waypoints and/or one or more location samples that are within a predefined distance to routes associated with one or more routing engines. That is, waypoints and/or one or more location samples indicating a proximity to an area with no mapped roads or paths (e.g., a wilderness, park, etc.) may be used by the traveled route platform 103 to represent a route traveled. In another embodiment, the route calculation module 207 selects a routing engine based on a mode of transportation. For example, a waypoint indicating a mode of transportation may be processed by a routing engine associated with the mode of transportation. That is, a waypoint indicating a mode of transportation associated with a car would use a routing engine associated with driving, such that sidewalks and bike paths may be excluded as candidates for routes traveled. Additionally, or alternatively, the routing engine may incorporate certainty levels derived in filtering the location samples to create the waypoints by, for example, selecting routes closer to waypoints associated with a higher certainty than waypoints associated with a lower certainty. In this manner, the route calculation module 207 may select routes associated with a higher certainty of accuracy. In one embodiment, the route calculation module 207 processes the one or more results of the one or more routing engines to cause, at least in part, a post-processing, an aggregation, or a combination thereof of the one or more results to determine the calculated route. For example, the route calculation module 207 may calculate a difference between a calculated route and one or more location samples used to generate the calculated route, and determine to use the calculated route when the calculated difference is within a predefined value. That is, if the calculated route exceeds, for example, a predefined distance value from detected location samples, the route calculation module 207 may use the location samples to represent a route traveled.

The game module 209 may work with the route calculation module 207 to determine gaming information. In one embodiment, the game module 209 determines an area bounded by a calculated route determined by the route calculation module 207. The game module 209 may, for instance, determine that the calculated route determined by route calculation module 207 forms a closed loop around an area, and designate the area as bounded by the calculated route. Additionally, or alternatively, the game module 209 may determine a dominance level associated with the area based on a mode of transportation. By way of example, a user associated with the route calculation indicating a bounded area may have a dominance level associated with the bounded area incremented by, for example, 10 points for a route calculation associated with walking or running, 5 points for a route calculation associated with bicycling, and 1 point for a route calculation associated with a car or a bus. It is contemplated that points may be accumulated for a UE 101, a user associated with UE 101, multiple users associated with UE 101, or a team associated with UE 101. For example, a user (or subscriber) of the traveled route platform 103 may have a user account to associate accumulated points with the user, other users, and/or a team of users. In one embodiment, the game module 209 determines a user, or group of users with a highest number of points for a bounded area, and designates the user, or group of users as an owner of the bounded area. It is contemplated that owners of a bounded area may be indicated on a map and have additional options not available to other users such as, for example, a display of a name, slogan, review, color, flag, and the like.

The communication interface 211 manages and controls any incoming and outgoing communication such as an indication of a user selection, a geographical location, a status of user equipment, and the like. The communication interface 211 can also manage other communications of the UE 101 such as Internet communications. For example, as discussed above, the traveled route platform 103 may retrieve one or more location samples stored in the location log 109 from the UE 101.

Figure 3:
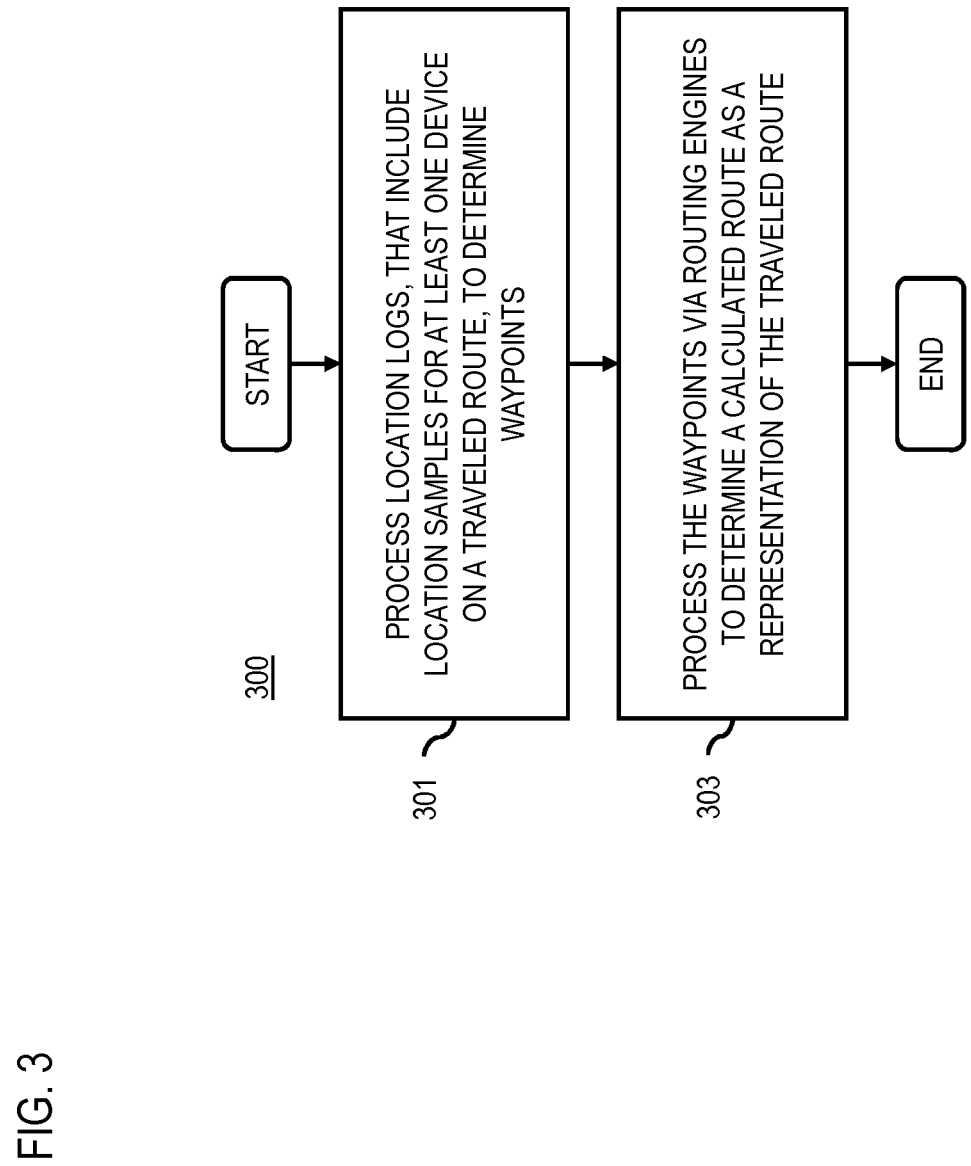
FIG. 3 is a flowchart of a process for providing a calculated route using waypoints associated with a traveled route, according to one embodiment.
Figure 8:
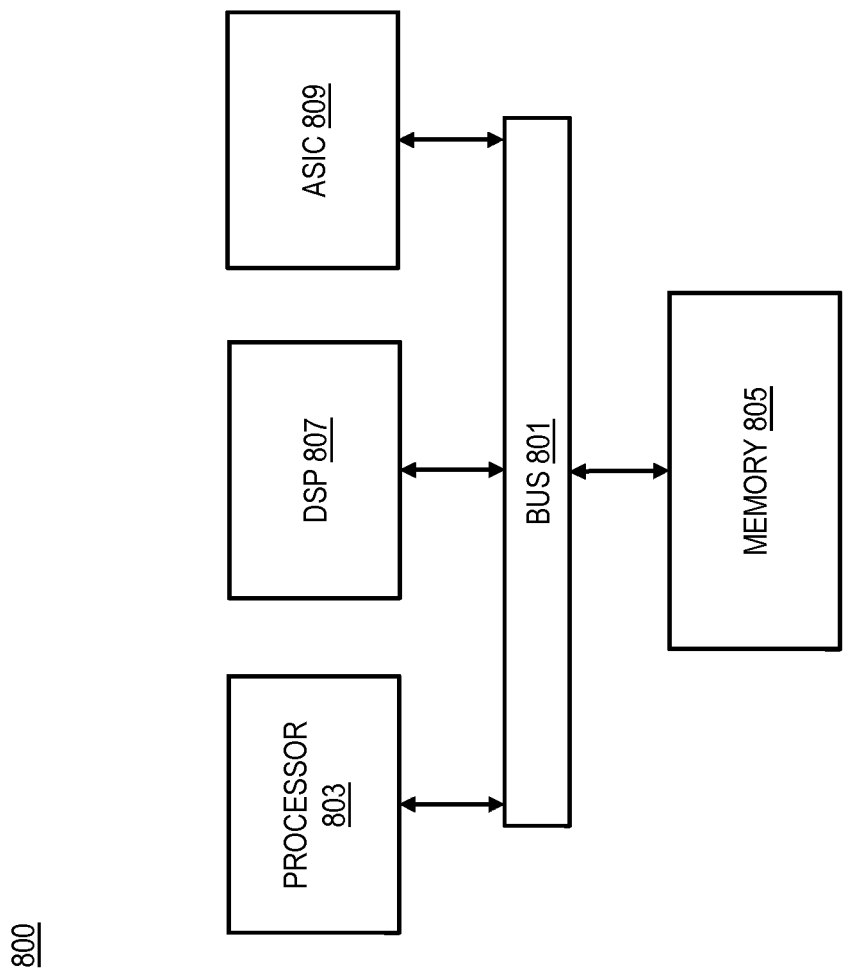
FIG. 8 is a diagram of a chip set that can be used to implement an embodiment of the invention.

FIG. 3 is a flowchart of a process for providing a calculated route using waypoints associated with a traveled route, according to one embodiment. In one embodiment, the traveled route platform 103 performs the process 300 and is implemented in, for instance, a chip set including a processor and a memory as shown in FIG. 8. In step 301, the traveled route platform 103 processes one or more location logs to determine one or more waypoints, wherein the one or more location logs include, at least in part, one or more location samples for at least one device on a traveled route. In one scenario, the waypoint module 205 may determine waypoints based on a subset of location samples that have not been filtered out of an initial set of location samples. Additionally, or alternatively, the waypoint module 205 may determine the waypoints based on a subset of predicted locations (e.g., using a Kalman filter) associated with the location samples in the location logs.

Next, in step 303, the traveled route platform 103 processes the one or more waypoints via one or more routing engines to determine a calculated route as a representation of the traveled route. By way of example, the route calculation module 207 may select one or more route segments that correspond to travel between the one or more waypoints, and then combine the route segments and the waypoints to form the calculated traveled route.

Figure 4:
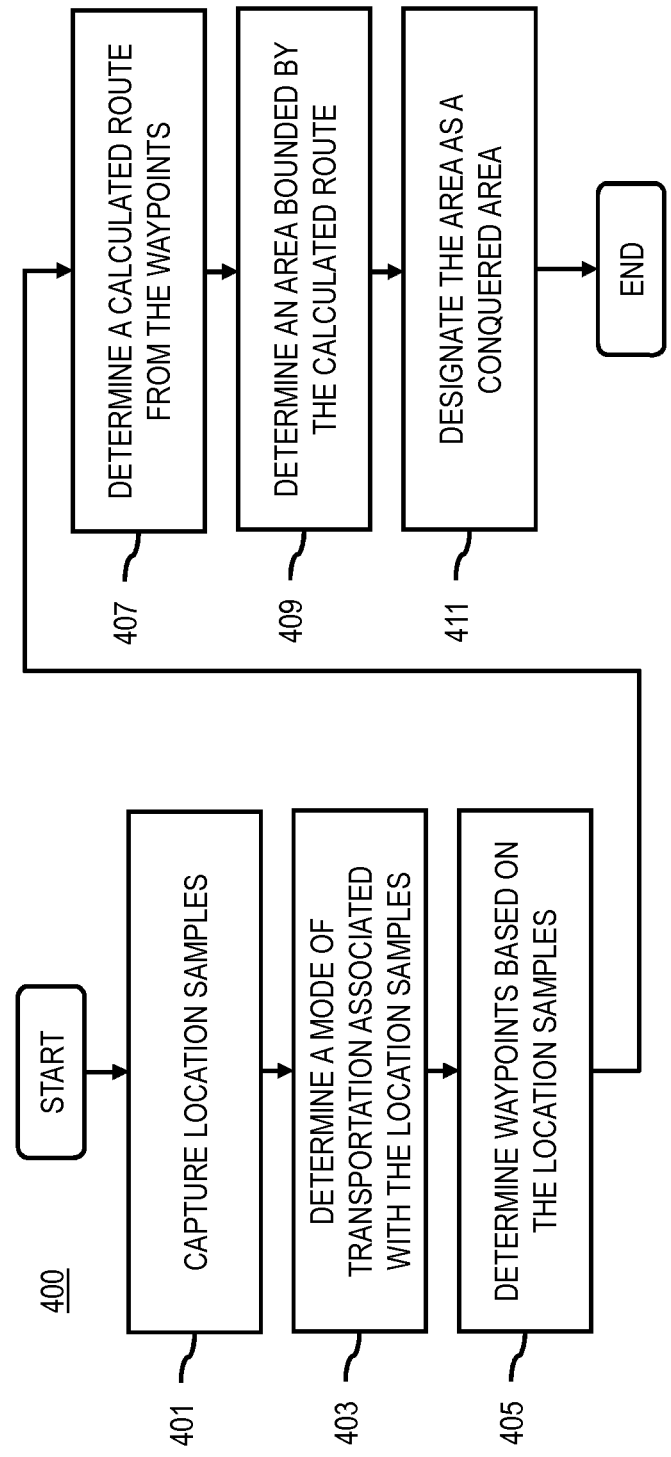
FIG. 4 is a flowchart of a process for designating an area as a conquered area, according to one embodiment.

FIG. 4 is a flowchart of a process for designating an area as a conquered area, according to one embodiment. In one embodiment, the traveled route platform 103 performs the process 400 and is implemented in, for instance, a chip set including a processor and a memory as shown in FIG. 8. In step 401, the capture module 203 selects one or more location samples for at least one device. For example, the UE 101 may, using a GPS location detection, determine a location, and the capture module 203 selects (and stores) a sample of location samples that both exceed a minimum temporal threshold and a minimum distance threshold. Additionally, the capture module 203 may include with the locations samples acceleration information obtained using the sensor module 107 on the at least one device.

Next, at step 403, the traveled route platform 103 determines a mode of transportation associated with the location samples. In one embodiment, the UE 101 determines a mode of transportation via, for example, a user input, or location detection technology (e.g., accelerometer, GPS, etc.). In another embodiment, the waypoint module 205 determines a mode of transportation when processing the one or more location samples stored in location log 109. For example, the waypoint module 205 may determine an average rate of motion for the one or more location samples stored in location log 109 and select a mode of transportation that corresponds to the determined average rate of motion. In another example, waypoint module 205 determines a predicted location for each of the one or more samples stored in location log 109 for each of a plurality of modes of transportation, determines a certainty level for each of the plurality of modes of transportation based on a comparison of the predicted location and the one or more samples, and selects the mode of transportations corresponding to the highest certainty level.

Once the mode of transportation is determined, one or more waypoints are determined, as in step 405, by processing one or more location logs. For example, the waypoints may a include a selection of the location samples selected by one or more filters, or may be calculated or predicted values determined by one or more filters (e.g., Kalman filter) based on the location samples of one or more location logs (e.g., location log 109). The waypoints are then used to determine, as in step 407, a calculated route. In one exemplary embodiment, the calculated route is selected based on a mode of transportation. Additionally, or alternatively, one or more routing engines may be selected to determine a calculated route as a representation of a traveled route based on the one or more waypoints. For example, a routing engine associated with traveled route platform 103 may be utilized, or another routing engine associated with the service platform 117 or the location-based gaming provider 115, may be utilized to determine the calculated route.

Once the calculated route is determined, the game module 209 determines, as in step 409, an area bounded by the calculated route. For example, a calculated route may surround multiple buildings, and each of the surrounded buildings is considered bounded by the calculated route. Once the area bounded is determined, the game module 209 designates, as in step 411, the area as a conquered area. Each area within the area bounded may, for instance, be designated as conquered by the UE 101, a user associated with the UE 101, or a group (or team) of users associated with UE 101. In another example, the game module 209 determines a dominance level associated with the area bounded for the UE 101 (or at least one user associated with UE 101). It is contemplated that the dominance level may be based on at least one mode of transportation and may include a previous dominance level from at least one other calculated route associated with the UE (or at least one user associated with UE 101). In this manner, users (or subscribers) of traveled route platform 103 may be challenged to accumulate a level of dominance, for example, to obtain a designation as owner of an area.

Figure 5A:
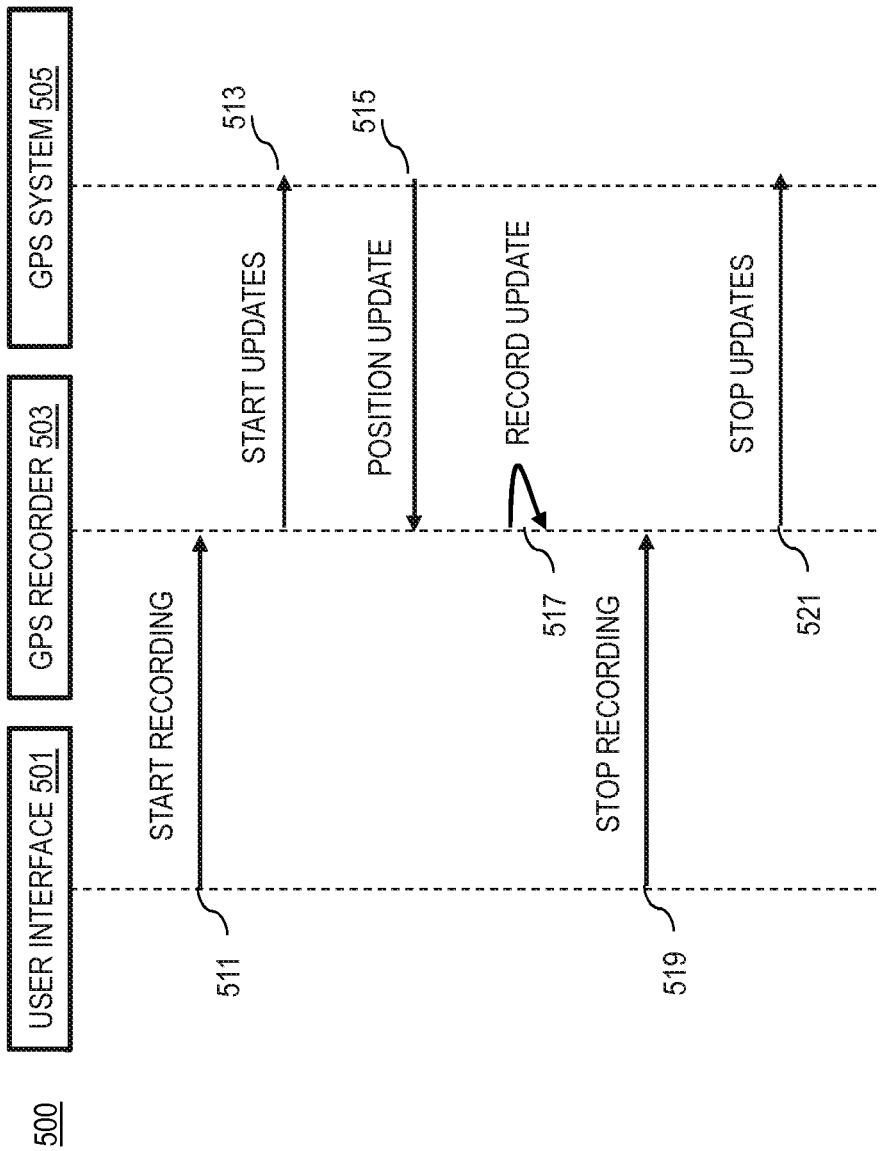
FIGS. 5A and 5B are ladder diagrams for providing a calculated route using waypoints associated with a traveled route, according to various embodiments.
Figure 5B:
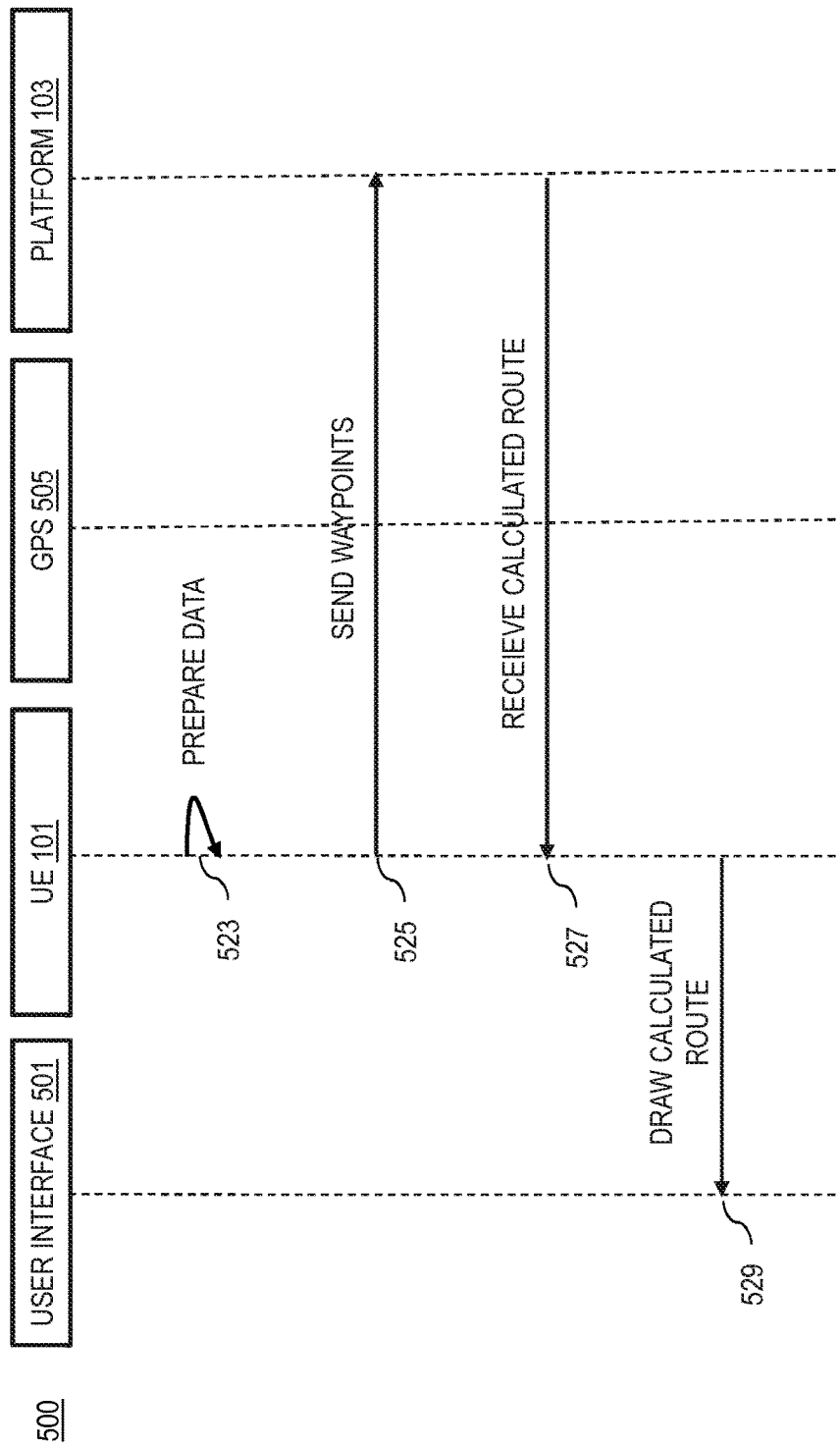

FIGS. 5A and 5B are ladder diagrams of a process for providing a calculated route using waypoints associated with a traveled route, according to one embodiment. As depicted, the diagram 500 includes a user interface 501, a GPS recorder 503 (e.g., sensor module 107), a GPS system 505, the UE 101 (shown in FIG. 5B), and the traveled route platform 103 (shown in FIG. 5B).

In this example, user interface 501 initiates, as in step 511, a request to start recording of the location of UE 101. The GPS recorder 503 then requests, as in step 513, an update of the position of UE 101 from the GPS system 505. The GPS system 505 then sends, as in step 515, a position update to the GPS recorder 503. The GPS recorder 503 records, as in step 517, the update. In one embodiment, the GPS recorder records every update received from the GPS system 505. In another embodiment, the GPS recorder records or captures at least one of the one or more location samples and captures or records at least another one of the one or more location samples based, at least in part, on a distance threshold, a temporal threshold, or a combination thereof. Steps 513, 515, and 517 repeat until the user interface 501 detects a user input indicating, as in step 519, a request to stop recording the position of UE 101. The GPS recorder 503 then sends, as in step 521, a request to GPS system 505 to stop sending updates.

Turning to FIG. 5B, the UE 101 prepares, as in step 523, data. In one embodiment, location data is processed by UE 101 to be stored in one or more location logs (e.g., location log 109). In another embodiment, the UE 101 (or the traveled route platform 103) processes one or more location logs to determine one or more waypoints, wherein the one or more location logs include, at least in part, one or more location samples for at least one device on a traveled route. In yet another embodiment, the UE 101 (or the traveled route platform 103) may process the one or more location logs to cause, at least in part, a filtering of the one or more location samples, wherein the one or more waypoints are determined based, at least in part, on the filtering. By way of example, one or more location samples may be filtered, further sampled, or processed by UE 101 to, for example, reduce detection errors. That is, the waypoint module 205 may be located on the UE 101 and may process the one or more location sample in location log 109, for example, using a Kalman filter with Wiener velocity and random walk models.

Once the waypoints are prepared in step 523, the UE 101 sends, as in step 525, the waypoints to the traveled route platform 103. In one embodiment, the traveled route platform 103 processes the one or more waypoints via one or more routing engines to determine a calculated route as a representation of the traveled route. Next, the UE 101 receives, as in step 527, the calculated route from traveled route platform 103. In one embodiment, the UE 101 (or the traveled route platform 103) processes the one or more results of the one or more routing engines to cause, at least in part, a post-processing, an aggregation, or a combination thereof of the one or more results to determine the calculated route. It is contemplated that the traveled route platform 103 may also send the calculated route to, for example, gaming provider 115. Once received, the user interface may draw, as in step 529, the calculated route on a screen located on UE 101.

Figure 6B:
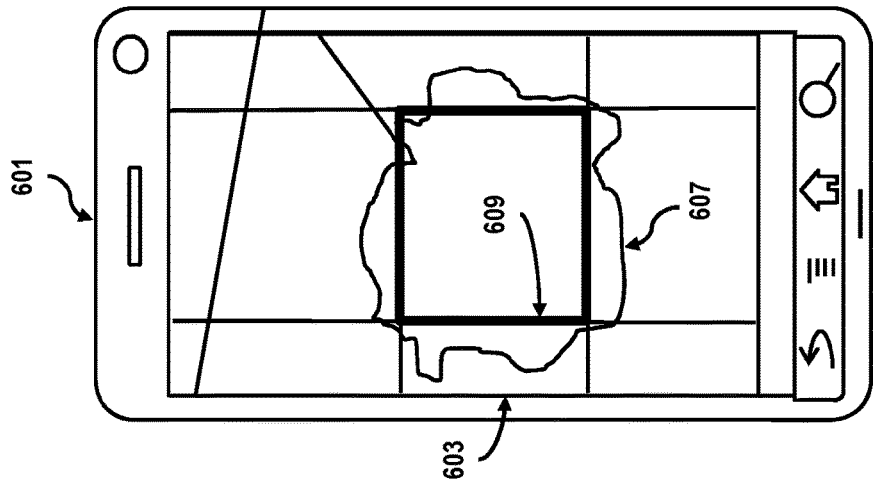
FIGS. 6A-6C are diagrams of user interfaces utilized in the processes of FIG. 3, according to various embodiments.
Figure 6A:
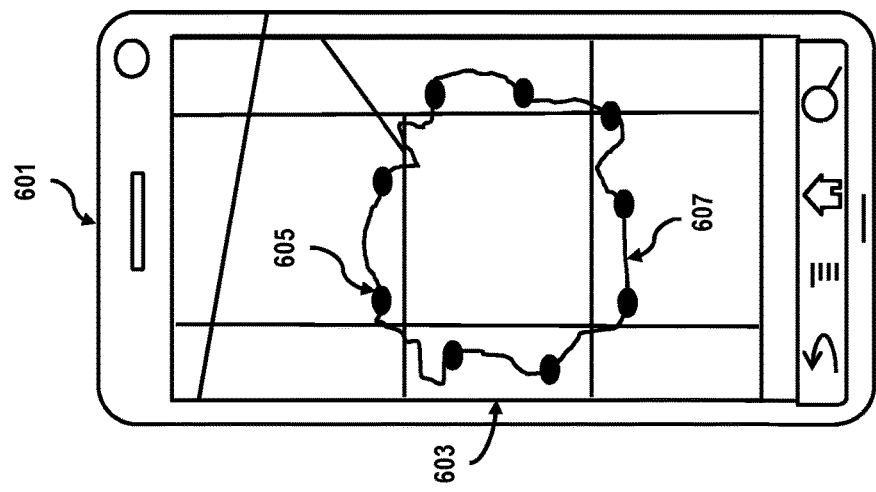
Figure 6C:
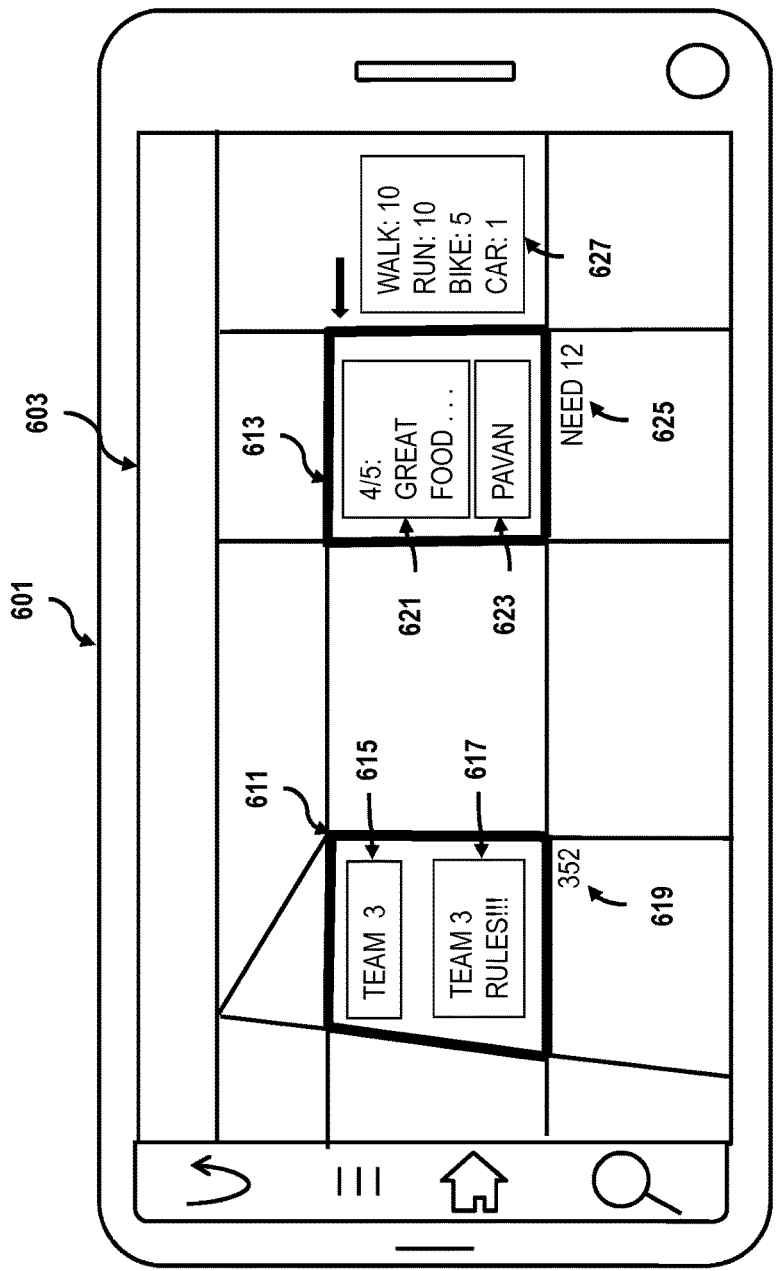

FIGS. 6A-6C are diagrams of user interfaces utilized in the processes of FIG. 3, according to various embodiments. FIG. 6A illustrates a mobile device 601 (e.g., UE 101) displaying a graphical user interface (GUI) 603. GUI 603 displays a map that includes one or more indicators 605 representing a sample stored in one or more logs (e.g., location log 109) and a representation 607 of a detected route traveled by mobile device 601. In one embodiment, the one or more indicators 605 represent a capture of at least one of the one or more location samples, and another capture of at least another one of the one or more location samples based, at least in part, on a distance threshold, a temporal threshold, or a combination thereof with respect to the capture of the at least one of the one or more location samples. In another embodiment, the one or more indicators 605 represent one or more waypoints of a processing of the one or more location logs to cause, at least in part, a filtering of the one or more location samples (e.g., samples illustrated in representation 607), wherein the one or more waypoints are determined based, at least in part, on the filtering.

FIG. 6B illustrates the mobile device 601 (e.g., UE 101) displaying the GUI 603 with a map that includes the representation 607 of a detected route traveled by mobile device 601 and a representation 609 of a calculated route determined using one or more routing engines. In one embodiment, the representation 609 is a representation of a traveled route from a processing of the one or more waypoints (e.g., the one or more indicators 605) via one or more routing engines to determine a calculated route as a representation of the traveled route.

FIG. 6C illustrates the mobile device 601 (e.g., UE 101) displaying the GUI 603 with a map that includes a first conquered area 611 and a second conquered area 613. In one embodiment, the traveled route platform 103, determines an area bounded by the calculated route and designates the area as a conquered area associated with (a) the at least one device, (b) at least one user associated with the at least one device, or (c) a combination thereof. For example, the traveled route platform 103 (or gaming provider 115) may designate the first conquered area 611 as conquered by a plurality of users associated with team 3 and designate the second conquered area 613 as conquered by a user. As illustrated in the exemplary embodiment, the first conquered area 611 includes an owner indicator 615 (e.g., a team name), a team slogan indicator 617, and a dominance level indicator 619 for the owner that corresponds to the first conquered area 611. In one embodiment, the traveled route platform 103 (or gaming provider 115) determines at least one dominance level associated with the area based, at least in part, on the at least one mode of transportation, wherein the designation of the area as the conquered area is based, at least in part, on the at least one dominance level. That is, the traveled route platform 103 may determine the dominance level 619 of the first conquered area 611 based on a mode of transportation used by one or more UE 101 associated with at least one owner indicated by the owner indicator 615. As illustrated in the exemplary embodiment, the second conquered area includes a comment indicator 621 relating to the area, an owner indicator 623 (e.g., a user), a shortfall indicator 625 in a dominance level or difference in points a user associated with mobile device 601 has compared to the owner of the conquered area, and a chart 627 indicating a point value for various modes of transportation. In one embodiment, the traveled route platform 103 (or gaming provider 115) determines respective one or more weighting values for the at least one mode of transportation based, at least in part, on an activity level associated with the at least one mode of transportation, wherein the at least one dominance level is further based, at least in part, on the one or more weighting values. By way of example, chart 627 may illustrate weighting values of: 10 points for a route calculation associated with walking or running, 5 points for a route calculation associated with bicycling, and 1 point for a route calculation associated with a car or a bus and the dominance level (e.g., shortfall indicator 625) is adjusted based on the weighting values.

The processes described herein for providing a calculated route using waypoints associated with a traveled route may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
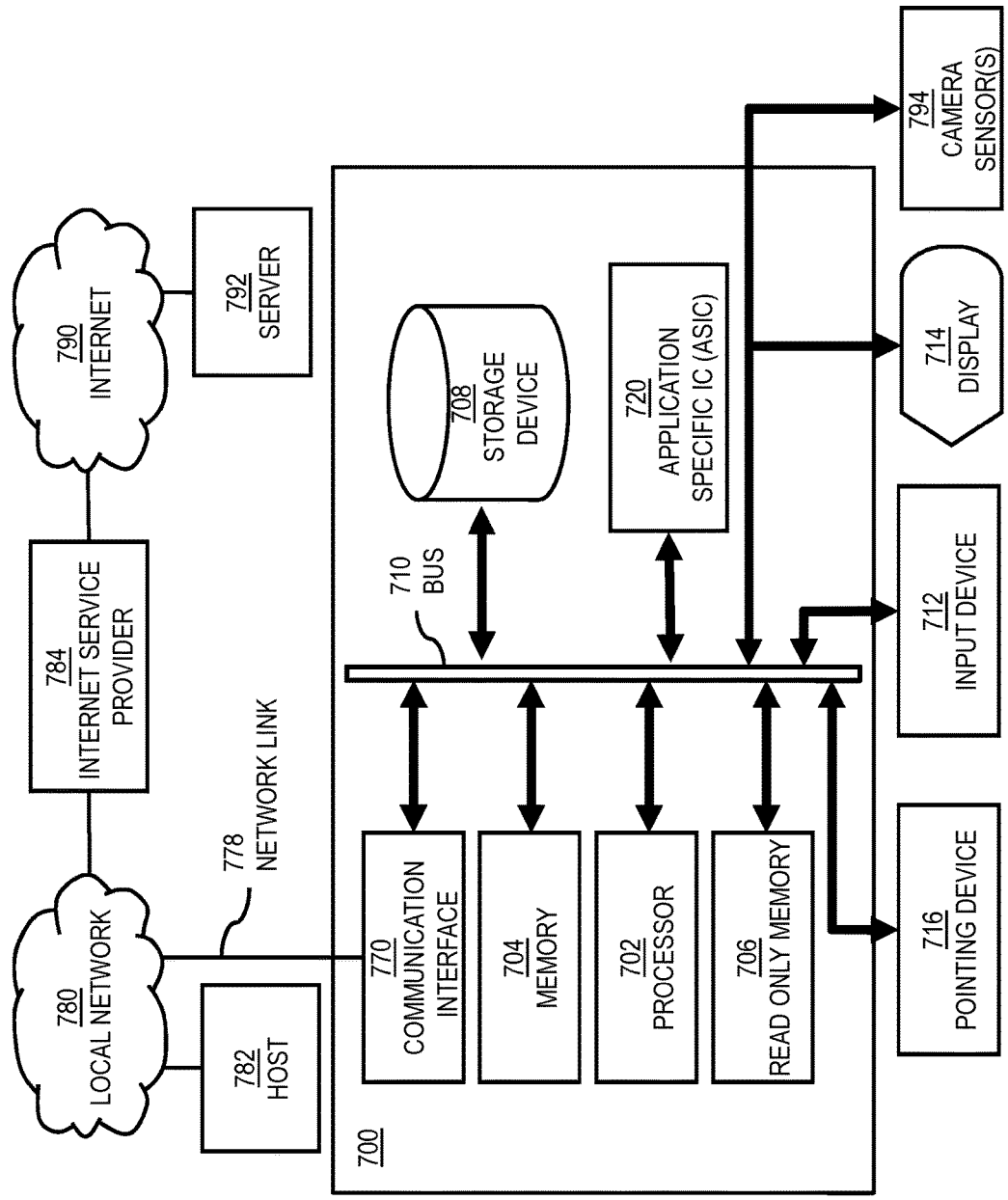
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a calculated route using waypoints associated with a traveled route as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a calculated route using waypoints associated with a traveled route.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing a calculated route using waypoints associated with a traveled route. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for providing a calculated route using waypoints associated with a traveled route. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a calculated route using waypoints associated with a traveled route, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a calculated route using waypoints associated with a traveled route to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to providing a calculated route using waypoints associated with a traveled route as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing a calculated route using waypoints associated with a traveled route.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a calculated route using waypoints associated with a traveled route. The memory 805 also stores the data associated with or generated by the execution of the inventive steps.

Figure 9:
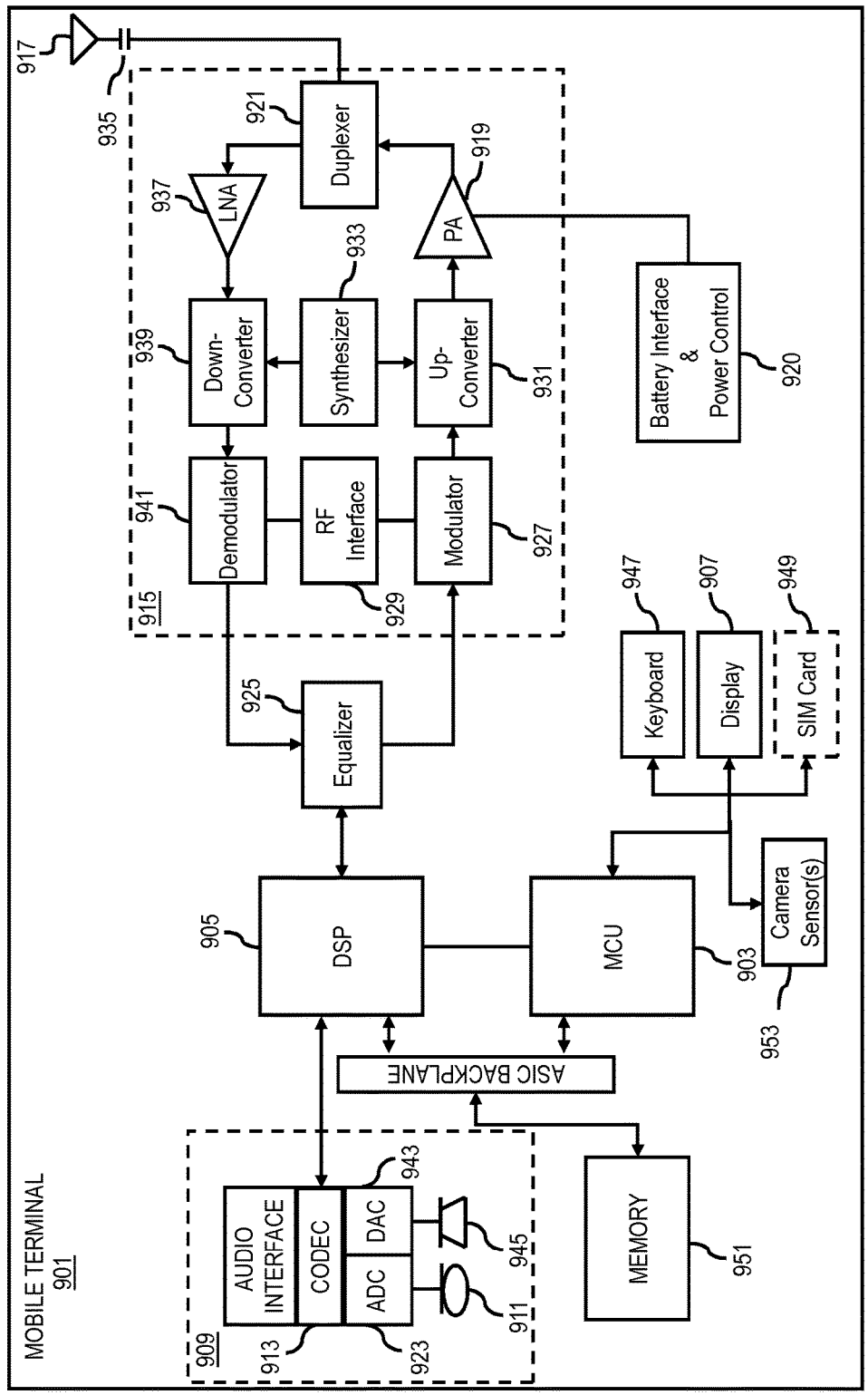
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing a calculated route using waypoints associated with a traveled route. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a calculated route using waypoints associated with a traveled route. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a calculated route using waypoints associated with a traveled route. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for determining a calculated route based on one or more location samples associated with one or more travel routes, the method comprising:
   receiving, utilizing at least one interface, the one or more location samples associated with one or more location logs associated with the one or more travel routes associated with at least one device;
   determining, utilizing at least one processor, a mode of transportation associated with a plurality of respective location points from the received one or more location samples,
      wherein the determined mode of transportation associated with a respective location point of the plurality is based on a rate of travel associated with the respective location point;
   determining a plurality of waypoints from the received one or more location samples by associating them with the determined mode of transportation,
      wherein the determined plurality of waypoints are associated with an equivalent determined mode of transportation;
   determining one or more route segments corresponding to travel between respective waypoints of the determined plurality of waypoints; and
   determining the calculated route by combining the determined route segments and their associated waypoints to form the calculated travel route.

2. The method of claim 1, further comprising:
   determining a level of certainty associated with the determined mode of transportation,
      wherein the determined plurality of waypoints are associated with an equivalent determined mode of transportation based on the determined level of certainty;
   at least one determination of an area bounded by the calculated route; and
   a designation of the area as a conquered area associated with (a) the at least one device, (b) at least one user associated with the at least one device, or (c) a combination thereof,
      wherein the improvement comprises providing the determined calculated route without inaccuracies associated with distortions due to multipath effects and/or electromagnetic interferences.

3. The method of claim 2, further comprising:
   an association of the determined mode of transportation with the calculated route, the conquered area, or a combination thereof.

4. The method of claim 3, further comprising:
   at least one determination of at least one dominance level associated with the area based, at least in part, on the determined mode of transportation,
   wherein the designation of the area as the conquered area is based, at least in part, on the at least one dominance level.

5. The method of claim 4, further comprising:
   at least one determination of respective one or more weighting values for the determined mode of transportation based, at least in part, on an activity level associated with the determined mode of transportation,
   wherein the at least one dominance level is further based, at least in part, on the one or more weighting values.

6. The method of claim 3, further comprising:
   a processing of the one or more location samples via one or more models, one or more filters, or a combination thereof to determine the determined mode of transportation.

7. The method of claim 3, further comprising:
   at least one determination of the one or more routing engines based, at least in part, on the determined mode of transportation.

8. The method of claim 7, further comprising:
   a processing of one or more results of the one or more routing engines to cause, at least in part, a post-processing, an aggregation, or a combination thereof of the one or more results to determine the calculated route.

9. The method of claim 1, further comprising:
   a capture of at least one of the one or more location samples, wherein the one or more location samples include acceleration information relating to the at least one device;
   another capture of at least another one of the one or more location samples based, at least in part, on a distance threshold, a temporal threshold, or a combination thereof with respect to the capture of the at least one of the one or more location samples; and a processing of the one or more location logs to determine at least one mode of transportation based, at least in part, on the acceleration information.

10. The method of claim 1, further comprising:
a processing of the one or more location logs to cause, at least in part, a filtering of the one or more location samples by removing location samples that exceed a rate of travel range associated with at least one determined mode of transportation,
wherein the one or more waypoints are determined based, at least in part, on the filtering.

11. An apparatus for determining a calculated route based on one or more location samples associated with one or more travel routes, the apparatus comprising:
at least one processor; and
at least one memory including computer program code for one or more programs,
the at least one memory and the computer program code configured to, with the at least one processor, cause the apparatus to perform at least the following,
receive, utilizing at least one interface, the one or more location samples associated with one or more location logs associated with the one or more travel routes associated with at least one device;
determine, utilizing the at least one processor, a mode of transportation associated with a plurality of respective location points from the received one or more location samples,
wherein the determined mode of transportation associated with a respective location point of the plurality is based on a rate of travel associated with the respective location point;
determine a plurality of waypoints from the received one or more location samples by associating them with the determined mode of transportation,
wherein the determined plurality of waypoints are associated with an equivalent determined mode of transportation;
determining one or more route segments corresponding to travel between respective waypoints of the determined plurality of waypoints; and
determining the calculated route by combining the determined route segments and their associated waypoints to form the calculated route.

12. An apparatus of claim 11, wherein the apparatus is further caused to:
determine a level of certainty associated with the determined mode of transportation,
wherein the determined plurality of waypoints are associated with an equivalent determined mode of transportation based on the determined level of certainty;
determine an area bounded by the calculated route; and
cause, at least in part, a designation of the area as a conquered area associated with (a) the at least one device, (b) at least one user associated with the at least one device, or (c) a combination thereof,
wherein the improvement comprises providing the determined calculated route without inaccuracies associated with distortions due to multipath effects and/or electromagnetic interferences.

13. An apparatus of claim 12, wherein the apparatus is further caused to:
cause, at least in part, an association of the determined mode of transportation with the calculated route, the conquered area, or a combination thereof.

14. An apparatus of claim 13, wherein the apparatus is further caused to:
determine at least one dominance level associated with the area based, at least in part, on the determined mode of transportation,
wherein the designation of the area as the conquered area is based, at least in part, on the at least one dominance level.

15. An apparatus of claim 14, wherein the apparatus is further caused to:
determine respective one or more weighting values for the determined mode of transportation based, at least in part, on an activity level associated with the determined mode of transportation,
wherein the at least one dominance level is further based, at least in part, on the one or more weighting values.

16. An apparatus of claim 13, wherein the apparatus is further caused to:
process and/or facilitate a processing of the one or more location samples via one or more models, one or more filters, or a combination thereof to determine the determined mode of transportation.

17. An apparatus of claim 13, wherein the apparatus is further caused to:
determine the one or more routing engines based, at least in part, on the determined mode of transportation.

18. An apparatus of claim 17, wherein the apparatus is further caused to:
process and/or facilitate a processing of one or more results of the one or more routing engines to cause, at least in part, a post-processing, an aggregation, or a combination thereof of the one or more results to determine the calculated route.

19. An apparatus of claim 11, wherein the apparatus is further caused to:
cause, at least in part, a capture of at least one of the one or more location samples, wherein the one or more location samples include acceleration information relating to the at least one device;
cause, at least in part, another capture of at least another one of the one or more location samples based, at least in part, on a distance threshold, a temporal threshold, or a combination thereof with respect to the capture of the at least one of the one or more location samples; and
process and/or facilitate a processing of the one or more location logs to determine at least one mode of transportation based, at least in part, on the acceleration information.

20. An apparatus of claim 11, wherein the apparatus is further caused to:
process and/or facilitate a processing of the one or more location logs to cause, at least in part, a filtering of the one or more location samples,
wherein the filtering of the one or more locations includes a determining of whether the one or more location samples are associated with a subset of predicted locations, and wherein the one or more waypoints are determined based, at least in part, on the filtering.

* * * * *